United States Patent

[11] 3,599,233

| | | |
|---|---|---|
| [72] | Inventor | Richard W. Meyer<br>2626 Letchworth Parkway, Toledo, Ohio 43606 |
| [21] | Appl. No. | 1,959 |
| [22] | Filed | Jan. 12, 1970 |
| [45] | Patented | Aug. 10, 1971<br>Continuation of application Ser. No. 462,770, Mar. 15, 1965, now abandoned, which is a continuation of application Ser. No. 16,042, Mar. 18, 1960, now abandoned. |

[54] APPARATUS FOR ANALYZING PIPELINE NETWORKS AND COMPUTING ELEMENTS THEREFOR
18 Claims, 20 Drawing Figs.

[52] U.S. Cl. ............................................. 235/151.34,
235/179, 235/185, 307/317, 323/81
[51] Int. Cl. ........................................................ G06g 7/50
[50] Field of Search........................................ 235/151.34,
197, 179, 184, 185

[56] References Cited
UNITED STATES PATENTS

| 2,509,042 | 5/1950 | McIlroy | 235/185 |
|---|---|---|---|
| 2,603,415 | 7/1952 | Silverman et al. | 235/151.2 X |
| 2,695,750 | 11/1954 | Kayan | 235/185 |
| 2,697,201 | 12/1954 | Harder | 235/197 X |
| 2,934,273 | 4/1960 | Elmore et al | 235/185 |
| 3,191,016 | 6/1965 | Holak et al. | 235/185 |

OTHER REFERENCES

Kovach et al.: Nonlinear Transfer Functions with Thyrite IRE Transactions on El. Comp. June 1958 p. 91/97

GALLI: How Diodes Generate Functions Control Engineering March 1958 p. 109/113

GALLI: Nonideal Diodes and Practical Function Generators Control Engineering February 1960 p. 107/109

*Primary Examiner*—Malcolm A. Morrison
*Assistant Examiner*—Felix D. Gruber
*Attorney*—Barnes, Kisselle, Raisch & Choate ABSTRACT: An apparatus for analyzing pipeline networks comprising an electrical circuit system arranged to simulate pipes and loads in a pipeline network comprising a plurality of interconnected computing elements, each connected to represent a pipe, a source of applied voltage connected to the electrical circuit system at a point where a source of pressure is connected to the pipeline network, and variable resistors connected to represent the loads in the system, such that varying voltage drops will occur across the computing elements as the applied voltage varies. Each computing element simulates the variation in fluid flow through a fluid conduit with variation in fluid pressure drop across the conduit over a predetermined range of pressure variation.

PATENTED AUG 10 1971  3,599,233

INVENTOR.
RICHARD W. MEYER
BY Richard W. Meyer

INVENTOR.
RICHARD W. MEYER
BY Richard W. Meyer

INVENTOR.
RICHARD W. MEYER
BY Richard W. Meyer

INVENTOR.
RICHARD W. MEYER

INVENTOR.
RICHARD W. MEYER
BY Richard W. Meyer

INVENTOR.
RICHARD W. MEYER
BY Richard W. Meyer

APPARATUS FOR ANALYZING PIPELINE NETWORKS AND COMPUTING ELEMENTS THEREFOR

CROSS REFERENCE TO RELATED APPLICATIONS

This application is a continuation of application Ser. No. 462,770, filed Mar. 15, 1965, which in turn is a continuation of application Ser. No. 16,042, filed Mar. 18, 1960; both are now abandoned.

This invention relates to distribution system analyzers and particularly to an improved method of analyzing rates of flow and friction head losses under steady state conditions and under conditions where the flow changes with time or some other parameter.

The problem of predicting the relationship between the velocity, and thus the quantity, of any material flowing in a defined conduit and the imposed pressure differential causing flow is of great importance in the design of any flow system. This problem is not easily solvable particularly as the conduit system becomes complex. Solutions, when conduits are defined piping, are generally based on the empirical equation presented by Hazen and Williams which is a special case of the general equation, $H=KQ^\alpha$, in which $H$ is the head drop in feet of material flowing over a particular pipe; $Q$ is the cubic feet per second flowing; $K$ is a factor reflecting the hydraulic resistance of the pipe and is a function of the type of material flowing, the diameter, length, and age of the pipe; and $\alpha$ is an exponent most usually assigned the value of 1.85.

Application of this problem to the analysis of the flow in a single pipe from a single source to a single discharge point is not difficult. Two of the quantities, $H$, $K$, or $Q$, must be known and the third is determined from the equation.

However, analysis of the flow in a system consisting of multiple pipes connected in series or parallel configurations to form loops which themselves may be in series of parallel connection is not at all simple. Since the flow in any single pipe is a function of the head drop over that pipe, such flow cannot be determined without knowledge of the pressures at the entrance and exit of the pipes connected to the pipe in question, which themselves cannot be determined without knowledge of the flow in the pipe in question—the original object of the investigation. Of course, there will be as many equations as there are unknowns and thus the problem is solvable. Since these are, however, nonlinear equations the solution is long and extremely tedious.

In practice, when such problems are to be solved arithmetically, a procedure for solution as presented by Professor Hardy Cross is used. It is to be emphasized that the Hardy Cross method is based upon the original equation as presented previously, and does not alter the mathematical relation. Rather, it provides for a step by step analysis as follows: All knowns in the flow problem, that is all physical dimensions, are determined and all $K$ values for existing and proposed pipes in the system are found. All known inputs and discharges from the pipe system are fixed as to value, position, and direction as determined by field measurement or design requirements. Next assumptions are made of the unknown quantities, generally flow through the pipes. Then based on these assumptions, the head drop over each pipe is computed. The next step requires the comparison of these computed values with the fundamental equations of conservation of matter and conservation of energy which in this problem take the forms of the rule that the total quantity per time flowing into any junction must equal the total quantity per time flowing out and the second rule that the total pressure variation, taking into account the sign of the variation, around any loop must be zero. To the extent that the assumed flows do not follow these rules, error exists and Hardy Cross provides an equation which will give a second approximation of flow which reduces the error. Errors that still exist in closing the head drop around each loop are then used to determined a correction factor which applied to the second approximation, gives a third, etc. Successive determinations are made until an error which is considered small enough to be acceptable still remains. The problem is then considered solved.

It is clear that this method of analysis, while it works, is extremely tedious and time consuming. It is also important to recognize that if the original flow system as analyzed is determined not to be acceptable in even a single component, when that single component is altered a new problem exists requiring, again, solution by all the steps as outlined before. The old solution will be of no direct mathematical assistance and will be useful, if at all, merely as a guide in making the first assumption.

The M. S. McIlroy U.S. Pat. No. 2,509,042 presents an improved method of solution for this problem. This patent shows a method of constructing an electrical analogous network to the pipe system, in which network, carefully designed temperature sensitive nonlinear resistances simulate pipes and exhibit a changing relationship of resistance with voltage so that they track an electrical curve between voltage and current substantially analogous to the hydraulic curve of pressure and flow quantity in the pipe represented by the equation $H=KQ^{1.85}$.

The McIlroy patent discloses the method of designing these resistors so that they present the correct resistance characteristic. Since they are temperature sensitive, the essence of the design is to establish the correct length, diameter, and configuration of the filament element making up the resistance so that there is a correct balance between the input energy to the filament and energy radiating from the filament so as to maintain the correct temperature and thus the correct resistance. By connecting these resistors in an electrical network physically congruent to the pipe network to be analyzed, an electrical analogy is constructed which will allow voltage and current to be metered and, by the application of suitable scaling factors, will allow the pressure and quantity flow at any point in the pipe system to be determined.

This method of analysis is a vast improvement over the arithmetic trial and error procedure. However, there are certain inherent disadvantages. Since temperature control is of the essence, such a unit must be large, fixed in position, and carefully protected in an air conditioned room. A high-voltage, high wattage source must be provided. Due to the high voltage imposed on the system, care must be taken during the operation that no network change, desired or inadvertant, will impose greater than design voltages on any component, thus any change to be made in the simulated circuit can only be accomplished when the computer is deenergized. Finally a major disadvantage occurs because the resistor units are at high temperatures solutions are temperature sensitive. The thermal inertia that results, therefore, precludes the use of such a device for very rapid analysis of the head losses effects in any system.

It is the object of this invention to provide a superior method of analyzing pipeline networks, wherein the solutions for a wide variety of assumed conditions may be obtained directly, accurately, and rapidly, without requiring tedious computation of values of flow and head losses in the system.

A further object of this invention is to provide a new and superior quantitative analogous electric network for analyzing pipeline networks.

A further object of this invention is to provide an electric unit for forming an analog to the pipe network that is compact, portable requiring no site preparation, requiring no external electrical connections and able to be taken directly to field problems.

A further object of this invention is to provide an electric unit for forming an analog to the pipe network that is constructed without specialized manufacturing procedure other than normally employed in electrical art.

It is a further object of this invention to provide an electrical unit for forming an analog to the pipe network that is not temperature sensitive.

It is a further object of this invention to provide an electrical unit for forming an analog to the pipe network that has no thermal inertia so as to impair the instantaneous response of the circuit It is a further object of the invention to provide an electrical circuit that can be adjusted to simulate any one of an infinite number of pipes when connected in the electrical analog to the pipe network.

It is a further object of this invention to provide an electrical unit for forming an analog to any nonlinear system, described by an equation of the form $Y=AX^B$ where $Y$ and $X$ are variables, $A$ is a proportionating factor and B an exponent, where $A$ is constant, B is constant or where $A$ varies with some other factor, where B varies with some other factor or when both $A$ and B vary with some other factor.

It is a further object of the invention to provide an electrical unit for forming an analog to any nonlinear system described by the equation $Y=AX^B$ where there are no limits of application of the analog by reason of restricted ranges of voltage and current.

It is a further object of the invention to provide an electrical unit for forming an analog to any system described by the equation $Y=AX^B$ that gives a continuous, smooth response with no appreciable discontinuities unless required.

It is a further object of this invention to provide an electrical unit for forming an analog to the pipe problem which is instantaneous in response and can be used to investigate the dynamic conditions of pressure and flow.

It is a further object of this invention to simulate a pipe flow material balance in an analog network by composing the network input and output terminals to be a two terminal network, so that electrical energy into the network equals energy out of the network.

It is a further object of the invention to provide an electrical analog to a nonlinear system wherein the graphical relation between variables is known, without need of establishing the exact mathematical relation. An example of this application would be the use of the computer to simulate a pump, the characteristic curve of which is empirically known by the equation for which is not derived.

It is a further object of the invention to provide an apparatus for producing smooth or segmented curves which apparatus uses a lesser number of parts than the conventional apparatus which produces only segmented curves.

It is a further object of the invention to provide an apparatus for producing curves having a sufficient smoothness such that the curves have agreement with mathematical curves thereby permitting the exchange of electrical signals for calculations and readily produce useful numerical solutions to desired problems.

It is a further object of the invention to provide an apparatus wherein opening (or shorting) of sections can be accomplished even when the apparatus is energized.

It is a further object of the invention to provide a network analog for monitoring and controlling a pipe network to show flow-pressure throughout a system for telemetered field data and to control the system to any desired condition.

It is a further object of the invention to provide an electric analog to the pipe flow network which can provide signals suitable to actuate recording or data logging equipment.

The present invention presents an improved method of simulating fluid flow problems, requiring no specially manufactured components, no temperature sensitive elements, no high operating voltage or temperature and consequently no thermal inertia to prohibit instantaneous response.

It can be constructed of parts generally known and used in electronic art, and the design of which can be rugged and compact. A unit simulating 125 pipes can be built with an overall dimension of approximately 1 ft. × 1 ft. × 3 ft.

The power required for operation of the computer is of low magnitude and the unit can be battery operated. In addition, the components are adequately rated to withstand electrical overload. As a result the unit is not subject to damage by routing alterations of the circuit.

For the purpose of illustrating the present invention, a water pipe distribution network will be used under steady flow condition. The invention is not limited in application to flow in a pipe or to compressible flow nor to steady flow. The invention can be used to determine values of pressure and flow in any part of a flow network under dynamic or steady state conditions.

In the drawings.

Figures 1, 3:
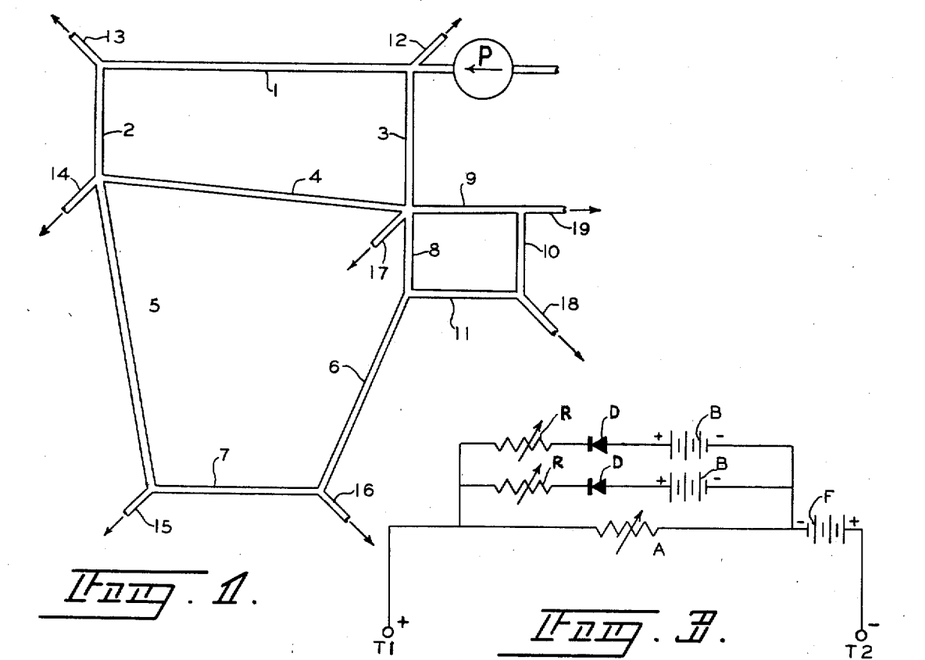
FIG. 1 is a diagrammatic view of a conventional pipeline network which may be solved by the system embodying the invention.
FIG. 3 is a wiring diagram of a computing element utilized in the invention.

FIG. 1 represents a convention pipeline network showing inputs to the system, a network of interconnected pipes 1 to 11, and loads 12—19 at various points in the network.

The invention consists of the development of an electrical circuit which will provide a current-voltage relationship over its terminals of the form described by the equation $E=KI^\alpha$ when $K$ and $\alpha$ can be fixed so that $K$ represents the hydraulic resistance coefficient of a pipe and $\alpha$ equals 1.85. This equation thus becomes the equation representing flow through a pipe.

Figure 2:
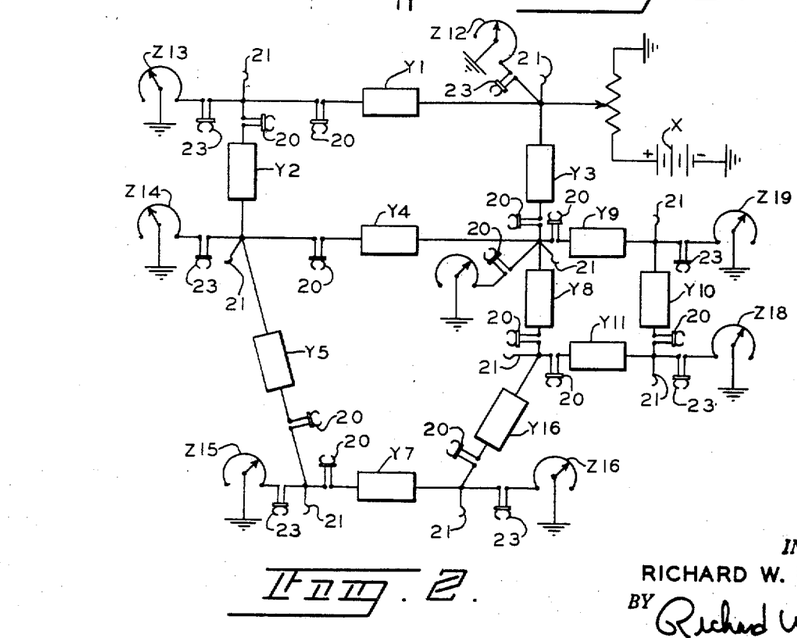
FIG. 2 is a diagrammatic electrical diagram of an apparatus embodying the invention.

FIG. 2 is a diagrammatic electrical diagram of the electrical analog to the pipe circuit shown in FIG. 1. The analog circuit comprises a voltage source, X, and potentiometer connected to computing elements Y, in parallel and series configuration and to variable resistors, Z. In the analog circuit, the voltage source represents the pump, the computing elements represents the pipes 1 to 11, the variable resistors Z—12 to Z—19 represent the loads 12—19 on the system, and 20 and 23 are metering jacks.

The computing elements Y comprising the legs of the circuit are each composed of an adjustable electrical circuit which can be made to simulate the hydraulic resistance of each specific leg in FIG. 1

FIG. 3 is the circuit of a typical computing element Y comprising one or more fixed or variable, linear or nonlinear resistors, A, bridged by one or more circuits comprising a fixed or variable resistor, R, a rectifier, D, and a voltage source, B, in series, which parallel network in turn is connected in series with a voltage source, F. In operation, the voltage across the external terminals, T1 and T2, and the current at the external terminals T1 and T2 can be made to assume a controllable nonlinear relationship.

Description of the operation of this circuit is given in terms of specific values but does not imply that the circuit is restricted to these values.

Figure 4:
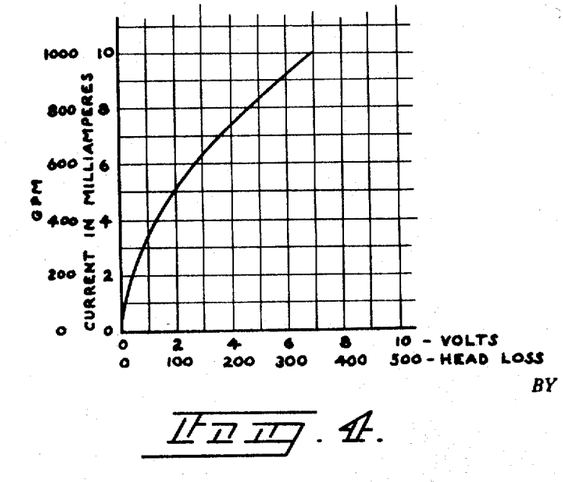
FIG. 4 is a curve of a typical equation utilized in solving a pipeline system problem.

As an example, FIG. 4 shows the relationship between pressure drop and quantity flow through a pipe with a hydraulic resistance coefficient of 100. Legs 1—11 of FIG. 1 is such a pipe.

FIG. 4 also shows the relationship between voltage drop and current flow through the circuit shown in FIG. 3 by utilizing different scale factors. With an appropriate scale factor the circuit therefor simulates the action of a pipe such as a leg of FIG. 1. It should be noted that these values are read on rectilinear scales.

The procedure for the determination of the appropriate magnitude of electrical parameters required to simulate a pipe with a specific hydraulic resistance coefficient will be disclosed later.

Figures 5, 6, 7, 8:
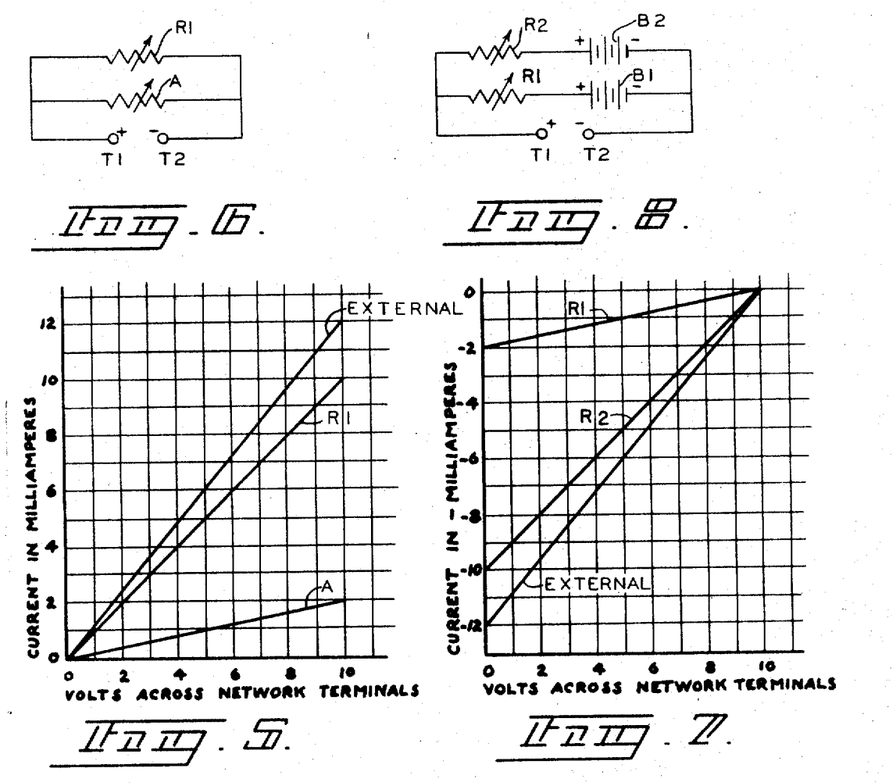
FIG. 5 are curves of current versus voltage relationship for the circuit shown in FIG. 6.
FIG. 6 is a wiring diagram of a circuit utilized in developing the invention.
FIG. 7 are curves of the current versus voltage relationships of the wiring diagram shown in FIG. 8.
FIG. 8 is wiring diagram of another circuit used in developing the invention.

FIG. 5 shows the familiar relationship between current and voltage over a fixed linear resistor. FIG. 5 also shows that relationship over a circuit consisting of two linear resistors A+K1 in parallel such as shown in FIG. 6. By insertion of a bias voltage, B1 B2 as shown in FIG. 8, the voltage-current relationship can be altered in form as shown in FIG. 7.

Figure 9:
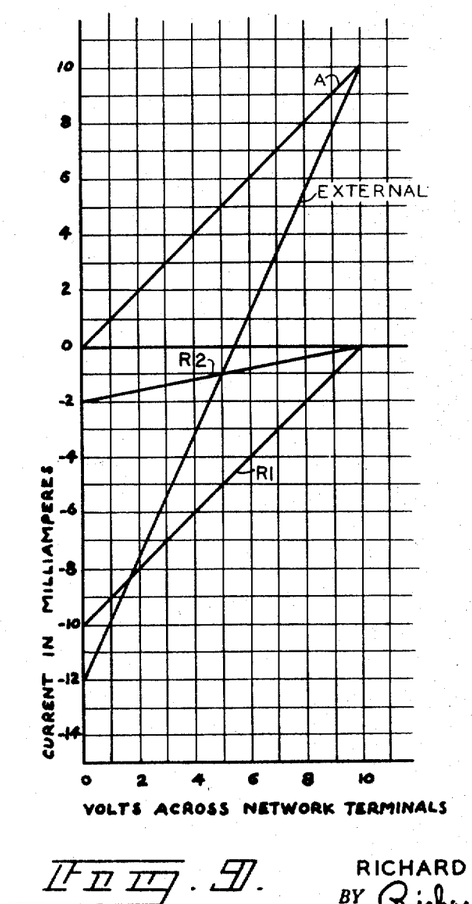
FIG. 9 are curves showing the current versus voltage relationships for the circuit shown in FIG. 1.
Figure 10:
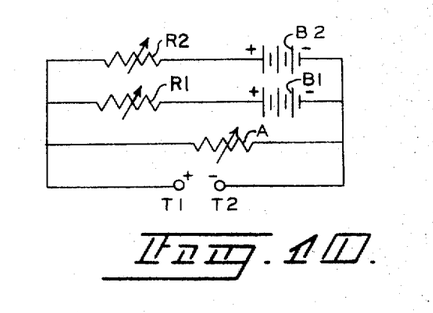
FIG. 10 is a wiring diagram of another circuit used in developing the invention.

Combining in a parallel circuit form biased linear resistors with an unbiased fixed linear resistor A as shown in FIG. 10 gives a voltage-current relationship as shown in FIG. 9.

Figures 11, 12:
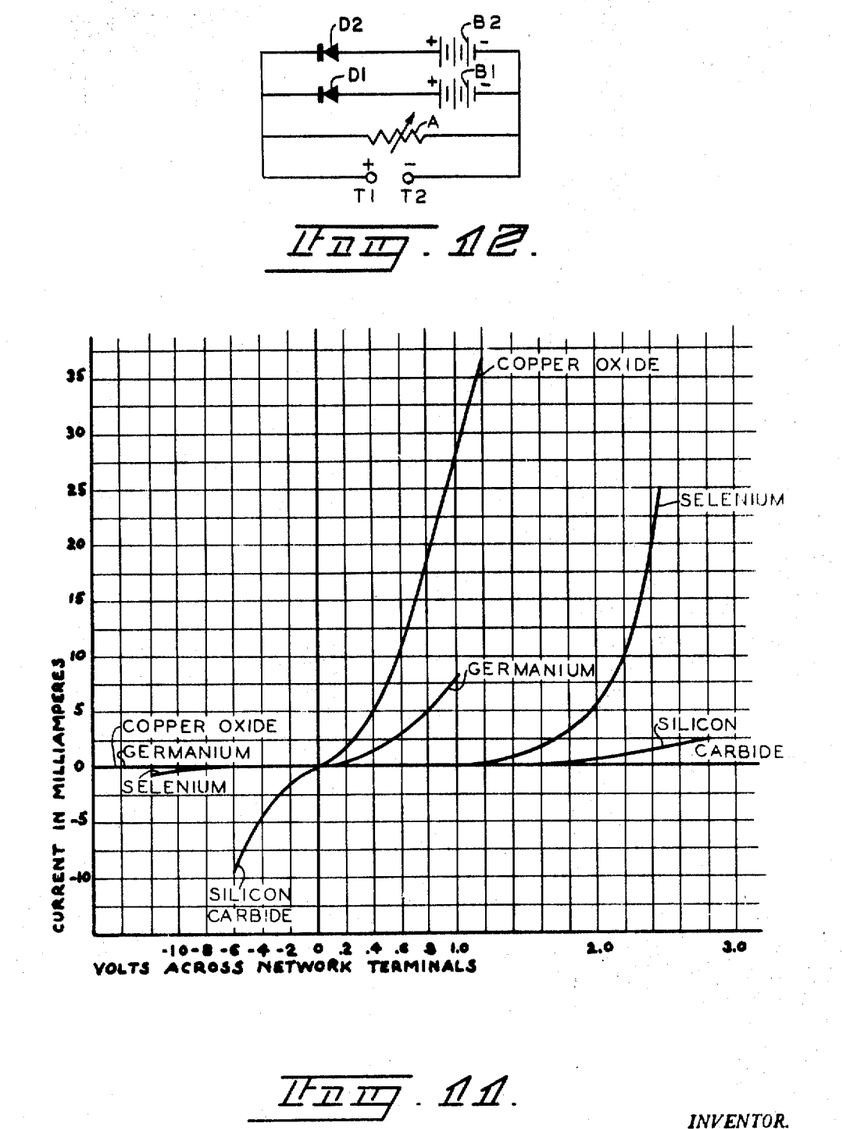
FIG. 11 is a series of curves of the nonlinear resistance for certain materials.
FIG. 12 is a wiring diagram of another circuit used in developing the invention.

FIG. 11 shows the voltage-current relationship over a number of existing nonlinear resistor materials. It should be noticed that these give a curve of the type $I=GV^B$ when B is larger than 1, giving a curve concave upward, where G is a coefficient of the material.

Figure 13:
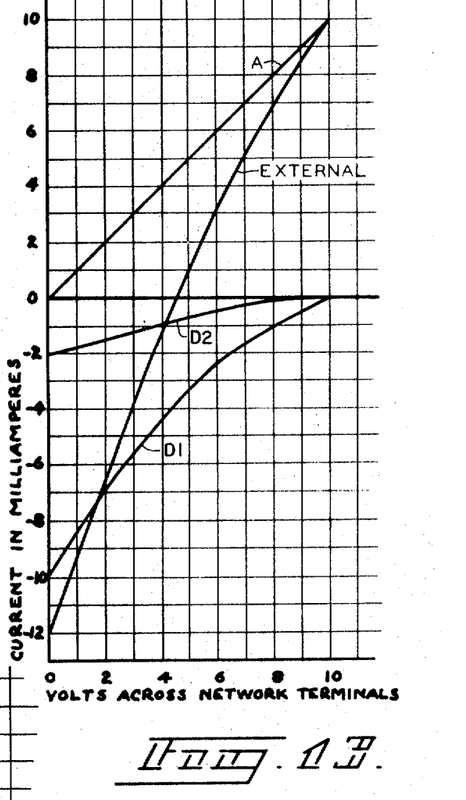
FIG. 13 are curves of current versus voltage relationships for the wiring diagram shown in FIG. 12.

By suitably replacing linear resistor R1 in the bridging circuit as shown in FIG. 8 with parallel nonlinear rectifiers D1 and D2, having the general characteristics as shown in FIG. 11, a circuit as shown in FIG. 12 is constructed which gives a voltage-current relationship as shown in FIG. 13.

It should be noticed that the curve is nonlinear in form. The amount of the nonlinearity exhibited can be controlled by the relative values of the resistor A, D1 and D2, the characteristics of the nonlinear rectifiers. It should now be noticed that the curve is concave downward.

Figure 14:
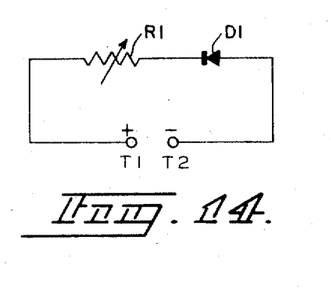
FIG. 14 is a wiring diagram of a typical rectifier resistance circuit.
Figure 15:
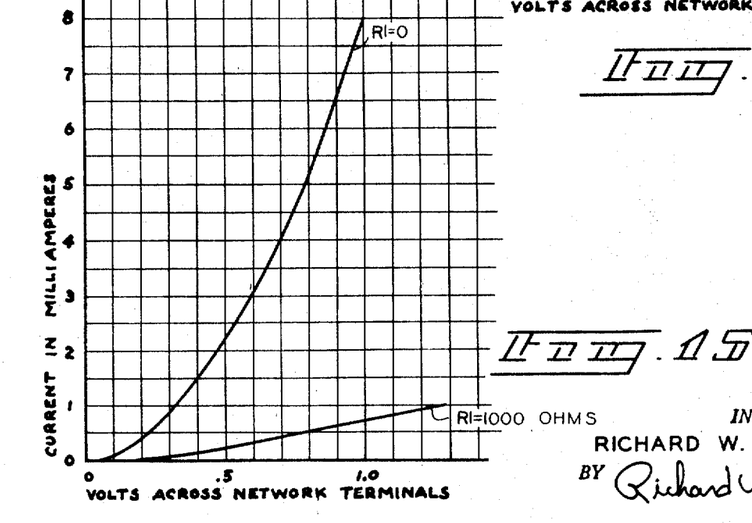
FIG. 15 are curves showing the current versus voltage relationships for the wiring diagram shown in FIG. 14.

The addition of a linear resistor in series with a nonlinear rectifier, for example, of germanium material as shown in FIG. 14 gives a smoothly varying voltage-current relationship without discontinuities as shown in FIG. 15.

Figure 16:
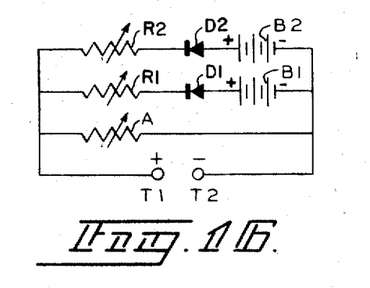
FIG. 16 is a wiring diagram utilized in developing the invention.
Figure 17:
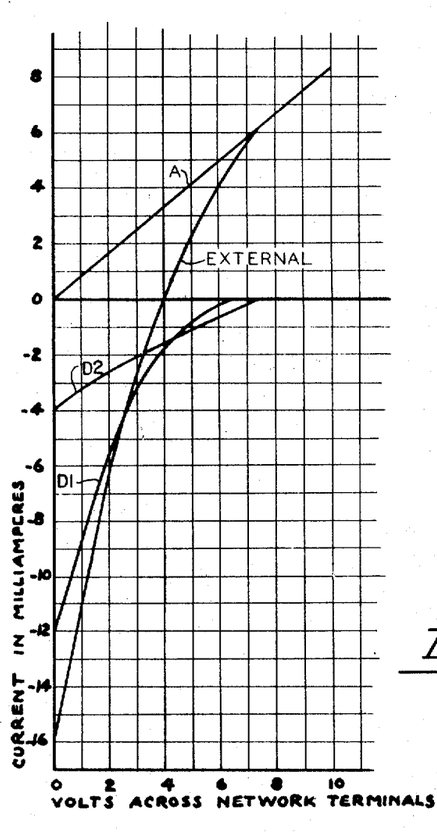
FIG. 17 are curves showing the current versus voltage relationships for the circuit shown in FIG. 16.

A means of controlling the relative values of the resistors is shown in FIG. 16 wherein linear resistors R1 and R2 are added. Action of this circuit is explained by the equation $I$ external $= I_A - (ID1 + ID2)$ where the $I$ values are the values in the circuits with the indicated subscripts. This equation is developed by summarizing the currents at the inlet junction according to Kirchoff's law. Solving this nonlinear equation graphically for $I$ external requires addition of ordinates and gives the curve as shown in FIG. 17. Since the magnitude of curvature is controllable by suitable choice of the values of the circuit components, it is possible to develop curves described by the equation $E=KI^{1.85}$. This plot is shown in FIG. 4 where $K$ has been arbitrarily assigned the value of 100.

In FIG. 3 it is elected to use biased germanium rectifier nonlinear resistors for D1 and D2 which provide selective direction of current flow depending on the effective bias polarities. In addition, a bias voltage source E of proper polarity, is added in series with the parallel nonlinear network, in order to shift the electrical voltage axis to the origin. Note that the response curve for this circuit now goes thru the origin as shown in FIG. 4.

TABLE I

Hydraulic and Electric Relationship of a Conduit Obeying Hazen-Williams Criteria for a Hydraulic Coefficient, K, of 100

| H Ft. of Head Loss | Q-GPM | Volts | Milliamperes |
|---|---|---|---|
| 5.0 | 100 | 0.1 | 1 |
| 18.0 | 200 | 0.361 | 2 |
| 37.9 | 300 | 0.760 | 3 |
| 64.0 | 400 full | response, 1.28 | 4 |
| 98.0 | 500 | 1.96 | 5 |
| 138. | 600 | 2.75 | 6 |
| 183. | 700 | 3.66 | 7 |
| 236. | 800 | 4.69 | 8 |
| 294. | 900 | 5.88 | 9 |
| 352 | 1000 | 7.05 | 10 |

* Dimension conversion factors for hydraulic relationship in $H=MKQ^{1.85}$ and electric relationship $V=NKI^{1.85}$ are as follows: $M=10^{-5}$ $Q$ in $GPM$; $N=10^{-3}$ $I$ in milliamperes.

A typical analog scale factor, used here, is to let 1 milliampere=100 $GPM$. For 100 $GPM$, the feet of head loss is equal to .1 volt, which is readily obtained from $V=10^{-3}(K=100)(1\ ma)^{1.85}$.

The hydraulic pipeline head loss coefficient is evaluated from standard tables or as follows:

$$K = \frac{5830 \text{ (length of pipe in feet)}}{(\text{Hazen-Williams C}) 1.85 \times (\text{pipe diameter in feet})^{4.87}}$$

As an illustration, FIG. 4 also shows an arbitrary hydraulic curve in electrical analog form accompanied by the calculations in TABLE 1, which show GPM, hydraulic head loss H, in ft., and the hydraulic coefficient K which is dependent upon length, diameter, and smoothness of the pipe as they are related by the Hazen-Williams equation $H=KQ^{1.85}$. The TABLE 1 also shows the application of scale factors to relate the hydraulic curve to the electric analog.

It can be seen that a circuit of this form will act electrically in a similar fashion to the hydraulic action of a pipe or a pipe equivalent.

Thus, if a voltage corresponding to a pump pressure is applied to the positive (+) terminal of the analog circuit and a circuit to withdraw current is connected to the negative (−) the terminal will simulate the action of a pipe transmitting fluid with a head drop as predicted by the Hazen-Williams equation.

Further, this circuit can be applied to simulate each individual pipe in a complete pipe network and when (+) voltage corresponding to pipe pressure is applied to the inlet of the system and connections to withdraw controlled amounts of current are made between the draft points and the negative side of the voltage source an electrical analog to the hydraulic system is created. The electrical flow throughout the system and the pressure drop developed because of this flow are instantaneously established and are directly related to their hydraulic counterparts.

There is no limit to the complexity of the system simulated. Unlimited numbers of sources, draft points, and interconnected pipes can be simulated in unrestricted configuration.

Since there is no perceptible time delay in the reaction of these circuit components, a designed time delay comparable to time change of momentum in the hydraulic system can be impressed on the entire electrical system or any part thereof for purposes of simulating the resultant dynamic loadings on the pipe system.

It will be clear that the present invention relates to the discovery of a superior electrical circuit which can produce a smooth continuous current versus voltage relationship over its two external terminals of the type $E=KI^a$ and therefor is analogous to all fluid flow systems described by similar equations. By employing this circuit, therefor, to simulate a fluid system, the tedious solution of simultaneous nonlinear equations is eliminated.

As shown, the circuit is composed so that it can be adjusted to solve the equation for any value of $\alpha$ or $K$, although $\alpha$ will generally be 1.85 and $K$ will generally vary from 1 to 20,000.

Further these components can all be powered by low voltage sources and they are not temperature sensitive Thus they exhibit no thermal inertia. Because of the low voltage employed, the circuits analogous to the legs of the pipe network can be removed or shorted without resulting damage.

In addition, since no time lag results from thermal inertia, this circuit can also be used to simulate the dynamic action of fluid flow by constructing an electrical analogous network with flow storage simulated by a correctly designed electrical capacitor circuit.

Since the invention consists of an electrical circuit, the $E$ versus $I$ response of which can be adjusted to fit the hydraulic curve or any other empirical data, this can be used to simulate data for which the functional relationship has not been formalized.

All components of this circuit are standard electrical units requiring no close manufacturing control, all are easily assembled in a compact space and none entail particular design difficulties.

Further, adjusting of loads, pressures and flows can be done manually to determine the full system response, or when telemetered field data is fed to the computer the existing pipeline system operating condition can be evaluated thereby utilizing the computer as an automatic monitoring and control instrument which can actuate pumps, valves, recording equipment, etc., to perform system dispatch-operator procedures.

DETERMINATION OF CIRCUIT CONSTANTS

It is necessary to show the method of assigning values to the electrical components identified as units, Y, in FIG. 2 in order to simulate a given pipe network. The following development shows this determination for both the steady state and dynamic condition.

It is common in the art, when designing nonlinear circuits, to employ graphical procedures because of the extreme difficulty of mathematical solution.

Considering one of the bridging circuits containing a fixed linear resistance and nonlinear resistance in series, the voltages are easily calculated if the series current is known. However, if the bridging voltage is known it is impossible to directly calculate the current unless the exponent of the nonlinear voltage is very low. In any other case it is necessary to assume values for the current and plot the curve of bridging voltage versus current to determine the current.

Similarly, if the nonlinear resistance is in parallel with the fixed linear resistance, the solution for total current is easy and the voltage solution must be obtained graphically or by approximation.

A complex mesh containing constant resistance and nonlinear resistances must conform to Kirchoffs' Laws, but the direct solution of the resulting equations usually is impossible, and a trial and error method is required.

Figure 18:
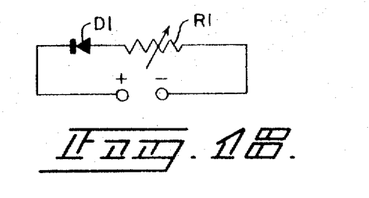
FIGS. 18 and 19 are further modified forms of wiring diagrams used for the computing element in the invention.
Figure 19:
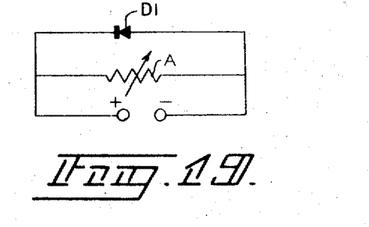

These simple bridging circuit equations are shown in FIGS. 18 and 19. Because of this formidable barrier to determine adjustments for the coefficients of materials, an empirical determination of settings has been devised, which easily permits evaluation of circuit requirements.

The procedure is carried out with the following steps:

1. Determine the hydraulic resistance coefficient for all pipes comprising the network to be analyzed.

2. Let the smallest hydraulic coefficient be equal to 10 and scale all other coefficients to this base. The value 10 is usually used as a base in that it gives a convenient range of electrical data. These coefficients are hereafter termed K values.

3. Plot the electrical curve $E=KI^{1.85}$ for all values of $K$ in the problem. In general, the curve need be plotted only in the range from 0 to 10 volts.

4. In order to make any computing element track the curve for a specific $K$ value, adjust resistance A shown in FIG. 3 so that the $E$-$I$ relationship over terminals T1 and T2 in FIG. 3 approaches the desired curve at the highest range of voltages from about 6 to 10 volts.

5. Adjust resistance R1 and voltage B1 so that the $E$-$I$ relationship as described in step 4 approaches the desired curve at the intermediate range of about 4 to 7 volts. 6. If further refinement is needed at the origin, a second bridging circuit is introduced and step 5 is repeated on the new circuit to accomplish tracking the desired curve in the lower range of voltages.

7. Adjust voltage F to accomplish zero external current and zero external voltage when the terminals T1 and T2 are shorted together.

8. It may be necessary to repeat steps 4, 5, 6, and 7 to obtain the desired fit. The results of this procedure are tabulated in TABLE II, which lists typical parameters for a range of $K$ values operating at a constant hydraulic exponent of 1.85. The evaluation is for the following constants; D1, D2 germanium rectifiers, B1=6 volts, B2=7.5 volts, F=4 volts.

TABLE II

Emperical Evaluation of the Electric Analog Network for the Hazen-Williams Criteria

| K | Resistance A | R₁ | R₂ |
|---|---|---|---|
| 10 | 320 | 260 | 340 |
| 40 | 650 | 640 | 980 |
| 100 | 1200 | 680 | 2200 |
| 335 | 2140 | 1340 | 3500 |
| 1600 | 3850 | 2200 | 9000 |
| 3000 | 8000 | 7500 | 9200 |
| 8550 | 13000 | 7500 | 14000 |

DYNAMIC ANALOG

Figure 20:
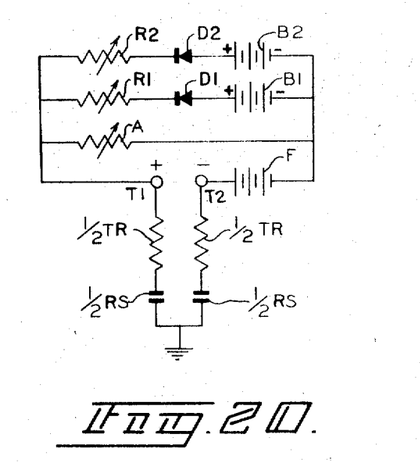
FIG. 20 is a wiring diagram showing a specific problem solved by the invention.

FIG. 20 shows the circuit for simulating the dynamic flow effect.

Flowing fluid possesses a momentum energy which can be converted by sudden stoppage or decreasing flow rate, into increased pressure head and vice versa. The change-of-flow pressure surge is so related to the pipe length, size, pipe material, viscosity of fluid, etc., that a pressure surge can be created which will rupture the containing pipe when a critical combination of these components exists.

From simple considerations of the exchange of energy between the kinetic state to the static state, equaling the energy relation, $$KE = PE$$

let $$\tfrac{1}{2}MV^2_{max} = \tfrac{1}{2}KX^2_{max}$$

where $M$, mass of fluid
$V_{max}$, velocity maximum
$K$, elasticity of fluid or compressibility constant
$X$, fluid compression distance.

This can be conceived of as a series of inertial elements linked together by elastic or flexible couplings capable of storing potential energy. If the leading element is suddenly stopped, the spring effect of each element must each in turn absorb the kinetic energy of the adjacent element, and convert it into potential energy. Furthermore, and importantly, a *a definite time delay occurs at each unit*, in order to decelerate the mass and build up the compression or potential energy. These two features may be obtained from the conservation of energy and momentum principles.

Solving for $X_{max}$, above
$$X_{max}=[M/K]^{1/2}V_{max}$$
Let
$$Z_c=[M/K]^{1/2} = \text{surge impedance}$$
For momentum
$$M\Delta V = F\Delta T$$
Gives
$$MV_{max} \sim KX_{max}\Delta T$$

$$\text{delay } \Delta T = \frac{MV_{max}}{KX_{max}} = \frac{M}{Z_oK} = \left[\frac{M}{K}\right]^{\frac{1}{2}}$$

The velocity of propogation of a pressure wave in the fluid is the acoustic velocity and is $$a \sim \frac{1}{\Delta T}\left[\frac{K}{M}\right]^{\frac{1}{2}}$$

For an elastic pressure wave, the corresponding values for $Z_0$ and $a$ become
$$Z_o 32 \ (a/g) = (\Delta H/\Delta V)$$
$H =$ feet of head of fluid
where
$V =$ fluid velocity
$g =$ acceleration due to gravity
and for unbounded fluid,
$$a=[E_b/p]^{1/2}$$
$p = $ density of fluid
$E_b = $ bulk modulus of elasticity of fluid.
In this, $a$ is useful in calculating valve closing speed, for instance, on a trunk main.

To provide for the analog of the pressure storage effect the coefficient of storage capacity is $$C = \frac{\text{Pipe area} \times E_b}{\text{Pipe length in ft.}} = \frac{AE_b}{L}$$

The change in momentum storage is a measure of pressure surge, which occurs in a finite delay time. Speaking in terms of simulation, the pipe time constant value has the same numerical value as the delay or conversion time from one form of energy to the other for a given pipe. FIG. 20 is one representation of the circuit required to achieve the dynamic behavior of the circuit required to achieve the dynamic behavior of a fluid-flow action by the electrical network analog and certain additions to the network inlet-outlet terminals.

Computation of $T_c$ and $C_s$, in electrical values, is accomplished from the developed relationships above, and additionally, the time constant per pipe. This is $$T_c = \frac{T}{C} = \frac{[E_bA]^{-1}}{a}L$$

Installation of the additional apparatus on a system of pipe analogs in complex form will provide a complete dynamic analog of the system.

I claim:

1. An electrical computing element for providing a variation in current flow through said computing element with variation in voltage applied across said computing element over a predetermined range of applied voltage variation ranging between zero and a first predetermined voltage, comprising, in combination: first and second terminals across which the voltage is applied; a first source of voltage and a first resistance connected in series between said first and second terminals; and a first branch circuit including a second source of voltage, nonlinear conducting means having a nonlinear voltage current characteristic and a second resistance connected in series with each other, said first branch circuit being connected in parallel with said first resistance, the sum of the absolute magnitudes of the voltages of said first and second sources being not less than said applied voltage, the magnitude of the second resistance is so related to the operating resistance of the nonlinear conducting means such that the resistance of the nonlinear conducting means is significant and, as a result, the current flowing through the first branch varies nonlinearly across said first branch and the current flowing through said terminals varies nonlinearly with the voltage applied across said terminals over the entire predetermined range of applied voltages.

2. The computing element according to claim 1 having a second branch circuit, said second branch circuit having a third source of voltage, second nonlinear conducting means and a third resistance connected in series with each other, said branch circuit being connected in parallel with said first resistance, the sum of the absolute magnitudes of the voltage of said third source and the voltage of said first source being greater than said first predetermined voltage, the magnitude of the third resistance is so related to the resistance of the second nonlinear conducting means such that the operating resistance of the nonlinear conducting means is significant and, as a result, the current flowing through the second branch varies nonlinearly across said second branch.

3. The computing element according to claim 2 wherein said first resistance has a resistance between 320 and 13,000 ohms, said second resistance leg has a resistance between 260 and 7,5000 ohms and said third resistance has a resistance between 340 and 14,000 ohms.

4. The combination set forth in claim 1 wherein the first and second voltage sources, first and second resistances, and nonlinear conducting means have values such that the current-voltage relationship that is produced across the leg is in accordance with the expression $E=KI^a$.

5. The combination set forth in claim 4 wherein K varies from 1 to 20,000.

6. The computing element according to claim 1 wherein said nonlinear conducting means comprises unidirectional conducting means.

7. The computing element according to claim 1 wherein said first resistance is selected from the group comprising a fixed resistance, a linear resistance and a nonlinear resistance.

8. The computing element according to claim 1 wherein said second resistance is variable.

9. The computing element according to claim 1 wherein said second resistance is linear.

10. In an apparatus for analyzing pipeline networks comprising an electrical circuit system arranged to simulate pipes and loads in a pipeline network comprising a plurality of interconnected computing elements, each connected to represent a pipe, a source of applied voltage connected to the electrical circuit system at a point where a source of pressure is connected to the pipeline network, and variable resistors connected to represent the loads in the system, such that varying voltage drops will occur across the computing elements as the applied voltage varies, the improvement wherein each computing element simulates the variation in fluid flow through a fluid conduit with variation in fluid pressure drop across the conduit over a predetermined range of pressure variation, by providing a variation in current flow through said computing element with variation in voltage drop across said computing element over a predetermined range of voltage drop variation ranging between zero and a first predetermined voltage, comprising, in combination: first and second terminals; a first source of voltage and a first resistance connected in series between said first and second terminals; and a first branch circuit including a second source of voltage, nonlinear conducting means having a nonlinear voltage current characteristic and a second resistance connected in series with each other, said first branch circuit being connected in parallel with said first resistance, the sum of the absolute magnitudes of the voltages of said first and second sources being not less than said applied voltage to said electrical circuit system, the magnitude of the second resistance is so related to the operating resistance of the nonlinear conducting means such that the resistance of the nonlinear conducting means is significant and, as a result, the current flowing through the first branch varies nonlinearly across said first branch and the current flowing through said terminals varies nonlinearly with the voltage drop across said terminals over the entire predetermined range of voltage drops.

11. The computing element according to claim 10 having a second branch circuit, said second branch circuit having a third source of voltage, second nonlinear conducting means and a third resistance connected in series with each other, said second branch circuit being connected in parallel with said first resistance, the sum of the absolute magnitudes of the voltage of said third source and the voltage of said first source being greater than said first predetermined voltage, the magnitude of the third resistance is so related to the operating resistance of the second nonlinear conducting means such that the resistance of the nonlinear conducting means is significant and, as a result, the current flowing through the second branch varies nonlinearly across said second branch.

12. The computing element according to claim 11 wherein said first resistance has a resistance between 320 and 13,000 ohms, said second resistance leg has a resistance between 260 and 7,5000 ohms and said third resistance has a resistance between 340 and 14,000 ohms.

13. The combination set forth in claim 10 wherein the first and second voltage sources, first and second resistances, and nonlinear conducting means have values such that the current-voltage relationship that is produced across the leg is in accordance with the expression $E = KI^\alpha$.

14. The combination set forth in claim 13 wherein K varies from 1 to 20,000.

15. The computing element according to claim 10 wherein said nonlinear conducting means comprises unidirectional conducting means.

16. The computing element according to claim 10 wherein said first resistance is selected from the group comprising a fixed resistance, a linear resistance and a nonlinear resistance.

17. The computing element according to claim 10 wherein said second resistance is variable.

18. The computing element according to claim 10 wherein said second resistance is linear.